United States Patent Office 3,367,168
Patented Feb. 6, 1968

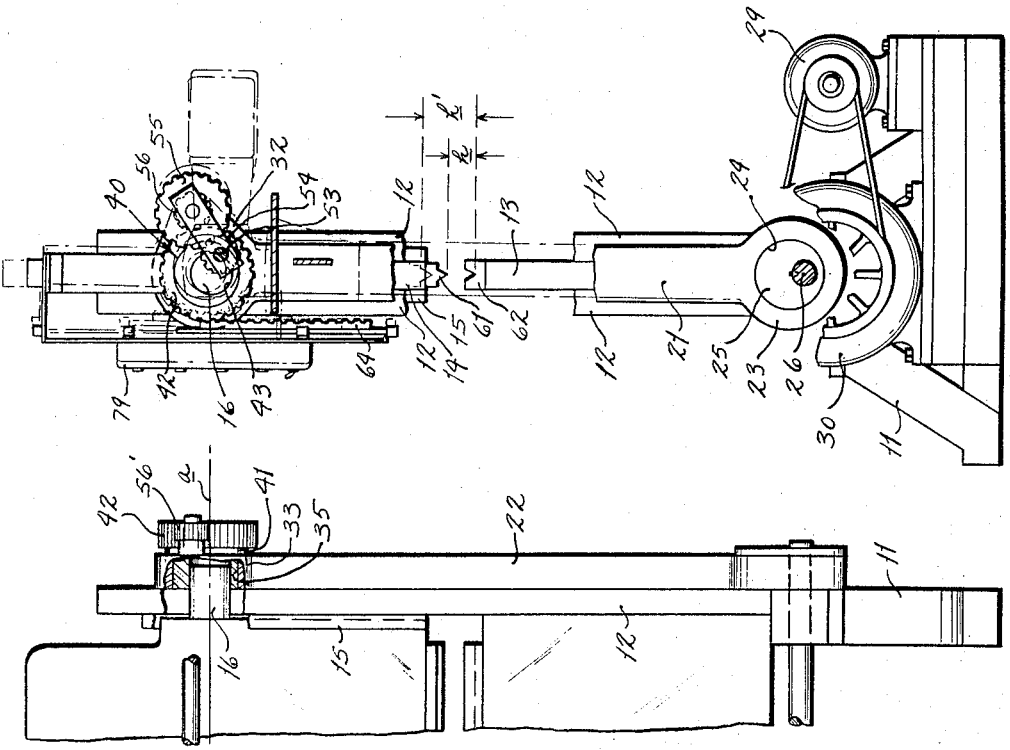

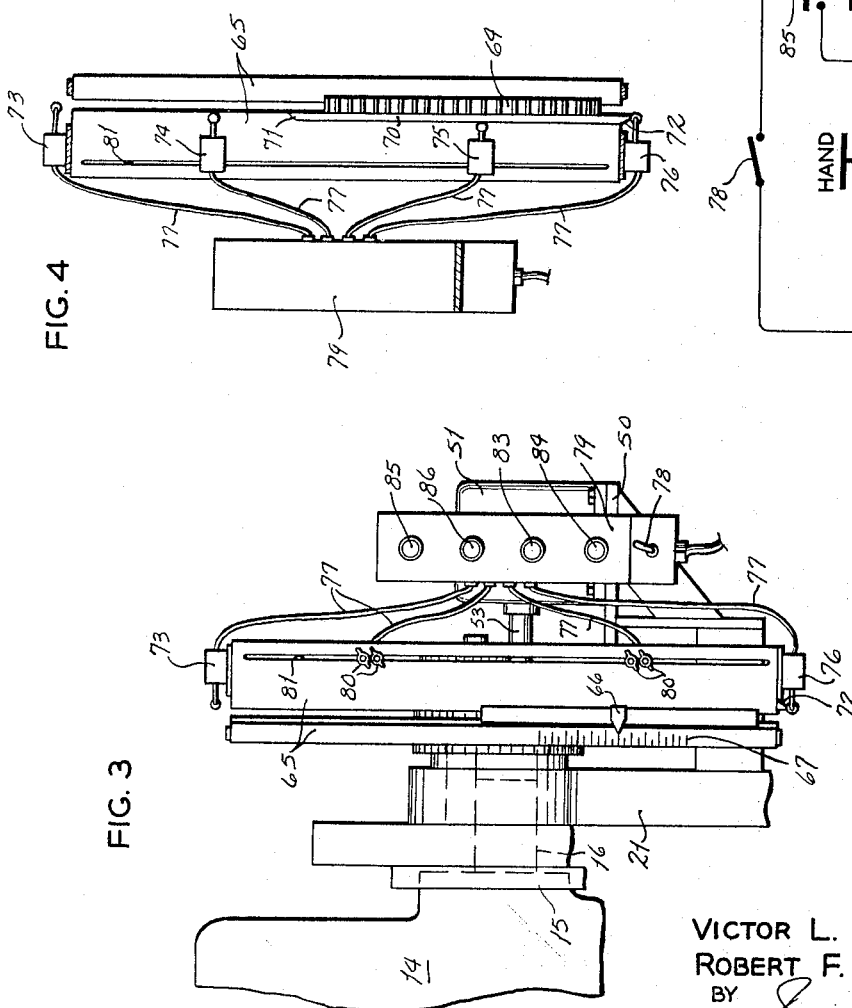

3,367,168
RAM HEIGHT ADJUSTMENT MECHANISM FOR PRESS BRAKES
Victor L. McHenry, Overland, and Robert F. Hartung, Jr., Bridgeton, Mo., assignors to Engel Equipment, Inc., St. Louis, Mo., a corporation of Missouri
Filed June 16, 1966, Ser. No. 558,140
6 Claims. (Cl. 72—441)

The present invention relates to ram height adjusting mechanisms for press brakes and the like.

In machine tools such as press brakes whose principal work-forming parts include a vertically reciprocating ram-like member having a fixed stroke length, it is desirable that there be some convenient means of adjusting the height of the ram, so that the fixed-length stroke will take place at a higher or lower level. Thus, in a press brake, if the ram can be adjusted so that the bottom of its stroke is above the bottom of the die, the ram may be readily lowered the complete stroke length and yet come only as close to the bottom of the die as may be desired. Thus, bends of varying angularity may be made, using a 90° bend die, without stopping the machine in mid-stroke.

In forming metal ducts and similar sheet metal work it will be desired to change quickly from one ram height position which causes a 90° bend to positions which cause lesser bends, such as a "break" of only about 12° from flat. Different metal thicknesses require further changes in ram position setting.

The purposes of the present invention include providing an adjusting mechanism whereby the stroke height of the ram-like member of a machine tool may be quickly and conveniently pre-set at a plurality of desired settings, so that the operator may change quickly from one setting to another. Another purpose is to provide convenient and reliable visual indications of the stroke height setting on an expanded vertical scale, whose positions are readily correlated by the operator with the physical change in stroke height setting. Another purpose is to permit the operator easy variation of the stroke height setting.

I attain these purposes, and others which will be apparent from the scope of this specification, in the present invention which may be generally summarized as follows:

Using the type of machine tool which employs a crank arm drive, the upper end of the crank arm raises and lowers an adjusting eccentric, which is angularly adjustable about the axis of a ram support pin. Its angular position is set by driving gear teeth on the perimeter of the adjusting eccentric, using a motor mounted on the aft side of the crank arm. A toothed rack, whose teeth mesh with those on the adjusting eccentric, slides vertically in a slide mounted on the forward side of the cranking arm, where the rack operates a visual indicator. Upper and lower limits of ram position height are fixed by limit switches, which serve also to prevent the upper and lower ends of the rack from being driven out of engagement with the adjusting eccentric. Between these limit switches are adjustable setting switches, readily set by the operator in selected positions corresponding to desired bends of the metal being formed.

The present invention will be readily understood by reference to the detailed specification of a preferred embodiment thereof and the accompanying drawings, in which:

FIG. 1 is a rear elevation, partly broken away, of a press brake embodying the present invention.

FIG. 2 is a left side view, partly in section taken along line 2—2 of FIG. 1. The dashed lines show the adjusting motor and gear reducer outwardly of the plane of the section. The phantom lines show the ram spaced upwardly.

FIG. 3 is an enlarged fragmentary view showing the stroke height adjustment indicator and the control apparatus therefor.

FIG. 4 is a similar fragmentary view of such parts, from the rear.

FIG. 5 is a wiring diagram for said controls.

The present invention is usable with the conventional type of press brake illustrated in FIGS. 1 and 2, characterized by a reciprocating ram operable through a fixed stroke length. Spaced-apart left and right leg frames 11, which may be of the A frame type, support upright frame members 12 at both left and right ends of the press. These frame members 12 are affixed to both sides of the left and right ends of a vertical bed plate 13. Above and in registration with it, the reciprocating plate-like ram 14 is aligned and guided between the smooth inner surfaces of vertical guide bars 15 secured to the upper portions of the uprights 12. The ram 14 is suspended at both left and right ends by large diameter cylindrical pins 16 which project outwardly endwise between the forward and rear frame members 12. The pins 16 have a horizontal axis $a$—$a$ about which their cylindrical surfaces are formed as surfaces of revolution.

Power-operated crank arm means which extend upward from below to engage these pins 16 through the stroke-height adjusting eccentrics to be described, and thereby support and operate the ram 14. The crank arm means consists principally of broad left and right end crank arms 21, 22, as shown in FIG. 1, the left crank being also shown in FIG. 2; as will be described, the upper ends of the crank arms 21, 22 do not support the pins 16 directly but rather support the adjusting means, hereafter described, in which the cylindrical pins 16 are supported on both left and right ends.

Sturdy left and right end crank arms 21, 22 are located outward of the upright frame members 12. The lower enlarged rod end 23 of each has a large central crank bore 24, in which a cranking drum 25 rotates, the drum 25 being keyed eccentrically to a horizontal power drive shaft 26. This extends across the press brake between the upper portions of the spaced-apart leg frames 11, so as to raise and lower both crank arms 21, 22 simultaneously. The driving motor 29 and its belt-driven speed reducer 30 are located outwardly of the left leg support frame 11, and transmit power of the driving motor 29 to the shaft 26.

The upper left crank rod end 32 and the upper right crank rod end 33 are enlarged massively to support the stroke-height adjusting mechanism, as will be later described. Each upper rod end 32, 33 has a large horizontal cylindrical support bore 35. Within these cylindrical bores 35 are mounted the stroke-height adjusting eccentrics generally designated 40. Each has an outer drum-like bearing surface 41, received within the upper crank rod bores 35, and an internal eccentric bore 43 located as shown in FIG. 2. Also, each has a radially enlarged toothed gear portion 42, which, concentric with the drum-like surface 41, projects endwise from the crank rod bore 35. The teeth extend around its outer perimeter. The eccentric bore 43 provides an internal cylindrical bearing surface which receives the cylindrical pins 16 on each end of the ram 14.

The vertical guides 15 prevent any movement of the ram 14 other than vertical. Rotation of the adjusting eccentrics 40 around the cylindrical ram pins 16 is possible because the crank arms 21, 22, will rock (as shown in FIG. 2 in phantom) on their driving drums 25.

The mechanism by which rotation is achieved, through small angles, includes a power source support bracket 50 welded onto the outer side of the left crank rod arm 21, supporting a speed reducer 51 with electric adjusting motor 52, powering through a speed reducer shaft 53 and the adjusting gear train, which includes three spur gears 54, 55, 56. The last spur gear 56 is adjacent to the aft side of, and meshes with, the gear portion 42 of the adjusting eccentric 40, at a point aft of the ram. This meshing spur gear 56 is mounted onto an adjustment cross shaft 57 supported in bores through the aft side of the enlarged upper left crank rod end 32 and upper right crank rod end 33, thus to drive synchronously a similar spur gear 56′ at the right side of the machine, which there similarly meshes with the toothed gear portion 42 of the right eccentric 40.

When the spur gears 56, 56′ rotate the gear portions 42 of the adjusting eccentrics 40, the height at which the ram 14 begins its final stroke will be adjusted as indicated in FIG. 2. Shown in solid lines is the lowest stroke height setting $h$; this will bring the ram punch 61 to the bottom of the die 62 affixed to the die bed 13. Shown in phantom lines is an adjusted height $h'$ illustrated to correspond to a rotation of 90° of the eccentric 40 from the solid line position. When set in the solid line position, the narrowest portion of the eccentric 40 will be beneath the pin 16 and the broadest portion will be above it. Rotation through 90° will thrust a somewhat broader part of the eccentric beneath the pin 16, raising it, while the narrowest portion will be brought forwardly and the broadest portion rearwardly (in FIG. 2, to the left and right sides respectively). This rocks the crank arms 21 about their driving drums 25, positioning them and the adjusting assembly slightly rearward as shown in the phantom lines of FIG. 2. This movement is not so great as to be disconcerting to the operator.

The novelty of the present invention relies principally in the provisions now to be described for indicating, setting and controlling the height at which the stroke of the ram 14 will take place. The positioning of the gear train, and particularly the location of the spur gear 56 and cross shaft 57 of the aft side of the ram 14 and adjusting eccentrics 40, leaves the gear portion 42 open at its forward side. In the present invention, this is taken advantage of. At this side the gear portion 42 engages the aft-presented teeth of a linear rack 64, which is mounted at the front of the machine in a slotted, substantially vertical rack slide 65 (shown enlarged in FIGS. 3 and 4), likewise supported by the enlarged upper end 33 of the left crank arm 21. Through the slot of the rack slide 65, the rack carries a position indicator pointer 66; the front surface of a portion of the rack slide 65 thereadjacent has graduations 67 marked to serve to identify desired stroke height settings. The scale of the graduations 67 is greatly enlarged over the actual change of stroke height; for example, the vertical movement of the rack indicator 66 for the illustrated 90° movement of the gear portion 42 is many times as great as the vertical displacement of the ram pins 16, which results from such 90° rotation of the eccentric 40. The resulting visual amplification is helpful to the operator in making precise adjustments of ram height setting, so as to assure precise bending of workpieces to the entire range of desired bend angles up to 90°.

Above the left side of the rack 64, as seen from the rear in FIGS. 1 and 4, is secured an elongated adjusting control cam 70 having rounded upper and lower cam ends 71, 72. The cam 70 operates a series of limit switches 73, 74, 75, 76, shown in FIG. 4, which with their connectors 77 and the off-on switch 78 are part of the control circuit hereinafter explained. These limit switches 73–76 and an off-on switch 78 are presented on the front surface of a control box 79.

Of these limit switches, the uppermost limit switch 73 serves to cut off power after the stroke height is raised to maximum and prevents continued rotation which would raise the toothed rack 64 out of engagement with the eccentric gear 42. The lowermost limit switch 76 similarly prevents the toothed rack 64 from being moved downwardly out of engagement. The intermediate limit switches 74, 75 are adjustably secured by thumb screws 80 along a slot 81, to fix desired intermediate ram stroke height settings. Typically, the lower of these adjustable limit switches 75 is set so that the punch 61 will lower within the die 62 sufficiently to form a 90° angle in sheet metal of selected gage and spring-back characteristic; while the upper of these limit switches 74 is set to cross-brake the same material at an angle of approximately 12°, such as is frequently utilized in sheet metal duct work.

The operation of the invention will be readily understood on considering the switch settings shown in the circuit diagram, FIG. 5, in connection with the illustration of the control box, FIG. 3, and its off-on switch 78, the two-position selector switches 83 and 84, and the touch-button switches 85, 86. All the limit switches 73–76 are of the spring-extended normally closed type. Closing the off-on toggle switch 78 conducts current to parallel circuits, one of which is selected by turning the two-position selector switch 83 to make the "Automatic" control circuit, shown at the lower left of the wiring diagram, leaving the "Hand" touch-button circuit theerabove open. With "Automatic" operation so chosen, the two-position selector switch 84 may be turned to the "Down" position, to close the circuit so that current will flow through the normally closed limit switches 75, 76 and through the reverse windings of the switch motor 52, until the control cam 70 on the rack 68 lowers sufficiently to press inward the spring of the lower adjustably-set switch 75, opening the circuit at precisely the stroke height set for a 90° bend. If the limit switch 75 malfunctioned and failed to open when so pressed, the rack 64 would continue to lower with continued rotation of the adjusting motor 52, until the lower cam end 72 similarly pressed inward on the lowermost limit switch 76, breaking the circuit to the motor 52. The circuit functions similarly in automatic control to set the stroke height upwardly.

If the selector switch 83 were instead set to the "Hand" position and it was desired to lower the ram height setting manually, this would be done by closing the off-on switch 78 and pressing the touch button "Down" switch 86, making a circuit which (in contrast with automatic operation as previously described) bypasses the adjustably set limit switch 75. Such circuit would energize the motor 52 to continue downward adjusting movement as long as the switch 86 was held down, until the lowermost limit switch 76 was engaged by the cam end 72, as shown in FIG. 4, to open the motor circuit. "Hand" operation in the upward sense will be apparent; the normally open "Up" switch 85 is depressed, bypassing the up-travel adjustable limit switch 74 and permitting controlled up-travel, as indicated by the visual indicator 66, until the cam upper end 71 opens the uppermost limit switch 73.

Such "Hand" adjustment is utilized preliminarily to establish, by experiment, the precise positions of the indicator 66 along the graduations 67 at which desired bend angles will be achieved with a particular die set 61, 62 for sheet material of chosen alloy, gage and temper. Once these indicator positions are established, the adjustable limit switches 74, 75 are set to correspond to them. Thereafter, the "Automatic" circuitry will result in powering the motor 52 only so long as required to return the stroke height adjustment to these pre-determined settings.

Variations of construction, within the scope of the present invention, may be made by those skilled in the art; for example, the circuitry may include additional provisions for presetting a variety of stroke height adjustments, and more complex visual indicator means may be utilized. Accordingly this invention is not to be construed narrrowly but rather as coextensive of the claims hereof.

We claim:

1. Ram height adjusting mechanism for a machine tool of the type having a ram means, vertical guide means therefor and power operated crank arm means to raise and lower the ram means, comprising ram support means having a horizontal axis and formed as a surface of revolution about said axis, an adjusting eccentric mounting said ram support means adjustably in said crank arm, and a toothed gear portion extending more than 180° about the perimeter of the eccentric, the crank arm having a motor support and a substantially vertical rack slide, a motor mounted on said motor support and having a gear drive meshing with the gear portion of the adjusting eccentric, whereby to rotate the eccentric in either direction and thereby adjust the height of the ram support means relative to the crank arm, a toothed rack mounted in said slide, the rack teeth engaging the toothed gear portion of the adjusting eccentric, means to limit the vertical travel of the rack to the region in which it remains in meshing engagement with the gear of the eccentric, and set stop switches adjustably aligned along the path of the rack, and connector means by which said switches stop the gear drive of the motor, whereby angular rotation of the adjusting eccentric may be set at limits corresponding to desired settings of ram height.

2. Ram height adjusting mechanism as defined in claim 1, the said ram support means adjusting eccentric and crank arm being located at an end of the ram means, the said motor support on the crank arm being positioned aft of the ram and the motor gear drive meshing with the adjusting eccentric aft of the ram, together with similar ram support means, adjusting eccentric and crank arm at the opposite end of the ram means, and a rotatable power transmission shaft extending aft of the ram means from the motor gear drive across to the opposite end of the ram means and there powering a similar gear meshing with the said similar adjusting eccentric, the said substantially vertical rack slide being forwardly of the ram means.

3. Ram height adjusting mechanism as defined in claim 1, together with linear visual indicator means adjacent to the rack slide and visible from the front of such machine tool, whereby vertical displacement of the ram support means within the eccentric attendant to its rotation is amplified on said linear indicator means.

4. Ram height adjusting mechanism as defined in claim 1, together with means to operate said motor reversibly.

5. Ram height adjusting mechanism as defined in claim 1, together with means to operate said motor in increments between the limits of ram height setting.

6. For use with a ram-operating machine tool of the type having ram-height adjustment means including an adjusting eccentric having at its periphery a toothed gear whose turning adjustably positions the ram height, control and position-indicating apparatus comprising a vertical slide-mounted rack forwardly of the ram of such machine tool and having teeth engaging such gear on the eccentric, whereby a representation of the height-adjusting movement of the ram means attendant angular rotation of the eccentric is amplified and presented vertically on said position-indicating apparatus, electrical limit switches set along the vertical slide path of the rack, and linear visual indicator means operatively associated with and adjacent to the rack slide and visible from the front of such machine tool.

References Cited

UNITED STATES PATENTS

| | | | |
|---|---|---|---|
| 2,656,744 | 10/1953 | Saxer | 72—441 |
| 2,793,584 | 5/1957 | Pearson | 100—256 |
| 2,797,724 | 7/1957 | Walldow | 72—441 |
| 2,840,135 | 6/1958 | Fowler | 72—441 |
| 3,041,963 | 7/1962 | Hazelton | 100—256 |
| 3,099,175 | 7/1963 | Lawson | 72—39 |
| 3,102,575 | 9/1963 | Engel | 72—415 |
| 3,142,206 | 7/1964 | Hague | 72—13 |
| 3,165,140 | 1/1965 | Hazelton | 72—441 |
| 3,191,412 | 6/1965 | Duvall | 72—26 |

CHARLES W. LANHAM, *Primary Examiner.*

G. P. CROSBY, *Assistant Examiner.*